United States Patent Office 3,167,541
Patented Jan. 26, 1965

3,167,541
5-(DIAZACYCLOALKYL)-10,11-DIHYDRO-DIBENZOCYCLOHEPTENES
Cornelis van der Stelt, Haarlem, Netherlands, assignor to N.V. Koninklijke Pharmaceutische Fabrieken v/h Brocades Stheeman en Pharmacia, Amsterdam, Netherlands, a Dutch corporation
No Drawing. Filed Apr. 18, 1962, Ser. No. 188,560
Claims priority, application Great Britain, Apr. 27, 1961, 15,354/61
6 Claims. (Cl. 260—239)

This invention relates to new basically substituted 5-(diazacycloalkyl)-10,11-dihydrodibenzocycloheptenes and their salts having valuable therapeutic properties, processes for the preparation thereof and new intermediates useful in such processes.

The therapeutically active compounds of this invention include 5 - (diazacycloalkyl)-10,11-dihydrodibenzocycloheptenes of the general Formula (I):

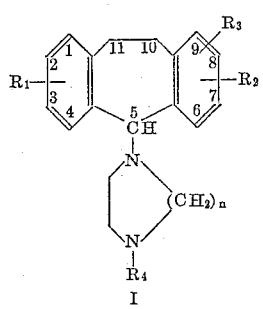

wherein $R_1$, $R_2$ and $R_3$ are the same or different and represent hydrogen, halogen or lower alkyl, $n$ is 1, 2 or 3, and $R_4$ represents alkyl, aryl, aralkyl or hydroxyalkyl; and salts thereof.

Among the suitable radicals represented by the symbol $R_4$ are: lower alkyl (e.g., methyl, ethyl, propyl, isopropyl and hexyl), monocyclic hydrocarbon aryl (e.g., phenyl), monocyclic hydrocarbon aryl lower alkyl (e.g., benzyl and β-phenylethyl), and mono- and di-hydroxy lower alkyl (e.g., hydroxymethylene, β-hydroxyethylene and α,β-dihydroxyethylene). The term "lower alkyl," as employed herein, includes both straight and branched chain radicals of less than 7 carbon atoms. The particularly preferred compounds are those wherein $R_1$ in in the 3-position and represents hydrogen, chloro or methyl, $R_2$ and $R_3$ are hydrogen, $R_4$ is methyl, phenyl or benzyl and $n$ is 2.

As to the salts of the 5-(diazacycloalkyl)-10,11-dihydrodibenzo cycloheptenes, those coming within the purview of the invention include the acid-addition salts, particularly the non-toxic acid-addition salts. Acids useful for preparing the acid addition salts include, inter alia, inorganic acids, such as the hydrohalic acids (e.g. hydrochloric and hydrobromic acid), sulfuric acid, nitric acid and phosphoric acid, and organic acids such as oxalic, maleic, tartaric, citric, acetic, fumaric and succinic acid. The compounds of this invention are therapeutically active compounds which are utilizable as psychotropic, antihistaminic and anticholinergic agents. They may be administered orally or parenterally in conventional dosage forms such as tablets, capsules, injectables or the like by incorporating the appropriate dose of the compound with carriers according to accepted pharmaceutical practice.

The compounds of this invention can be prepared by one of the processes of this invention employing as the starting material a 10,11-dihydro-5H-dibenzo[a,d]cyclohepten-5-ol of the general Formula II:

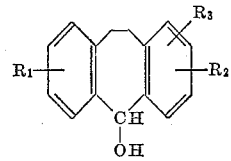

wherein $R_1$, $R_2$ and $R_3$ are as hereinbefore defined. In those instances where the starting carbinol is new, it can be prepared by interacting a phthalic anhydride with a phenylacetic acid to yield a benzalphthalide derivative which in turn is reacted with phosphorus and hydroiodic acid to yield the corresponding dibenzyl-o-carbonic acid. The resulting carbonic acid derivative is then cyclized either by treatment with phosphorus pentoxide at an elevated temperature or by first converting it into the acid chloride and cyclization of the latter. The ketone is thereupon reduced by conventional means. This series of reactions is shown by the following equations wherein $R_1$, $R_2$ and $R_3$ are as hereinbefore defined:

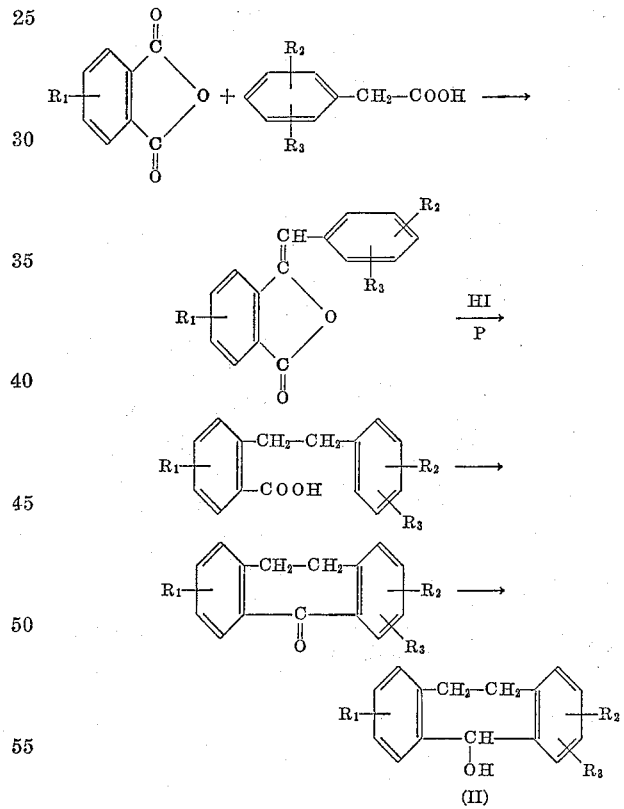

If a suitable phthalic anhydride is used as a reactant in the above series of reactions the position of the substituent on the resulting benzalphthalide will depend on the position of the substituent of the phthalic anhydride. Thus, where ortho substituted phthalic anhydride is condensed with phenylacetic acid, a mixture of 4- and 7-substituted 3-benzalphthalides is obtained. These products are then separated by fractional crystallization and the separated products treated with phosphorus and hydroiodic acid, followed by cyclization, to yield a 1-substituted 10,11-dihydro-5H-dibenzo [a,d]cyclohepten-5-one and a 4-substituted-10,11-dihydro-5H-dibenzo[a,d]-cyclohepten-5-one, respectively. Where a meta substituted phthalic anhydride is used, a mixture of 5- and 6- substituted 3-benzalphthalides is obtained. These products are then separated by fractional crystallization and then treated with phosphorus and hydroiodic acid followed by crystallization to yield a 2-substituted 10,11-dihydro-5H-dibenzo[a,d]cyclohepten-5-one and 3-substituted 10,11-dihydro-5H-dibenzo[a,d]cyclohepten-5-one, respectively.

Each of these ketones is reduced to the corresponding carbinol. Said reductions can be carried out either by using sodium amalgamate in alcoholic solution or such complex hydrides as sodium borohydride or lithium aluminum hydride as a reducing agent.

If a substituted phenylacetic acid is used as a reactant in the above series of reactions, the position of the substituent on the resulting benzalphthalide will depend on the position of the substituent on the phenylacetic acid. Thus, if an ortho substituted phenylacetic acid is condensed with phthalic anhydried and the remaining steps of the process are carried out, a 1-substituted 10,11-dihydro-5H-dibenzo[a,d]cycloheptene 5-ol is obtained.

If a meta substituted phenylacetic acid is used, a mixture of 2-substituted and 4-substituted 10,11-dihydro-5H-dibenzo[a,d] cyclohepten-5-ols is prepared, which are separated by fractional crystallization. If a para substituted phenylacetic acid is used, a 3-substituted 10,11-dihydro-5H-dibenzo[a,d]cyclohepten-5-ol is obtained.

Similar rules apply in those cases wherein a phenyl nucleus is substituted by more than one halogen atom or (lower alkyl) radical. Among the suitable phthalic anhydrides utilizable as initial reagents in these reactions may be mentioned: phthalic anhydride; halo-phthalic anhydrides, such as 3- and 4-chlorophthalic anhydride and 3- and 4-bromophthalic anhydride; (lower alkyl) phthalic anhydrides, such as 3- and 4-methylphthalic anhydride, 3- and 4-ethylphthalic anhydride, 3- and 4-isopropylphthalic anhydride, and 3- and 4-tert. butylphthalic anhydride.

Among the suitable phenylacetic acids utilizable as initial reagents in these reactions may be mentioned: phenylacetic acid; halo-phenylacetic acids, such as o,m, and p-chlorophenyl acetic acid and o,m, and p-bromophenyl acetic acid; and (lower alkyl) phenyl acetic acids, such as o,m, and p-methylphenylacetic acid, o,m, and p-ethylphenylacetic acid, o,m, and p-isopropyl phenylacetic acid, o,m, and p-tert.butylphenylacetic acid and di-(lower alkyl)substituted phenyl acetic acids such as 2,3-, 2,4-, 2,5-, 2,6-, 3,4- and 3,5-dimethylphenylacetic acids.

To prepare the compounds of this invention, the carbinol first is converted into the corresponding halide, preferably the chloride, which are new compounds of this invention, by treatment with compounds such as hydrohalic acids, such as hydrochloric acid and hydrobromic acid; thionylhalides, such as thionylchloride and thionyl bromide; phosphorus halides such as phosphorus pentachloride; and phosphorus oxyhalides such as phosphorus oxychloride. The resulting halide of the general Formula III:

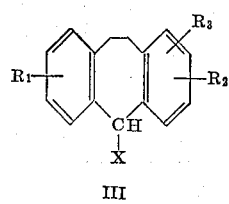

III wherein $R_1$, $R_2$ and $R_3$ are as hereinbefore defined and X is halo, preferably chloro or bromo is then interacted with a diazacycloalkane of the formula:

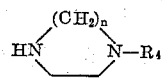

wherein $n$ and $R_4$ are as hereinbefore defined, the reaction preferably being conducted in the presence of an acid binding substance such as sodium carbonate, potassium carbonate or other carbonates, oxides or hydroxides of alkali or alkaline earth metals or in the presence of an excess of the diazacycloalkane derivative. In carrying out the reaction between the 5-halo-10,11-dihydro-5H-dibenzo[a,d]cycloheptenes and the diazacycloalkanes it may be convient to make use of an inert solvent such as xylene, chlorobenzene, dichlorobenzene.

The compounds of this invention may be purified either by distillation of the base or by crystallization of the acid addition salts.

The following examples illustrate the invention. The first eight examples are directed to the prepartion of the carbinol intermediates and the remaining examples are directed to the preparation of the final compounds of this invention. All temperatures are in centigrade.

EXAMPLE 1

*10,11-dihydro-5H-dibenzo[a,d]cyclohepten-5-ol*

(a) *Preparation of 3-benzalphthalide.*—In a 500 ml. round bottom flask are placed 100 grams of phthalic anhydride, 110 grams of phenylacetic acid and 26 grams of fused sodium acetate. The reaction mixture is heated rapidly in an oil-bath until the initial temperature reaches 230°. During the next three hours the internal temperature is slowly raised to 240°, during which time the water formed in the reaction is allowed to distill out. The mixture is then cooled to 90° and the product dissolved in 400 ml. of boiling alcohol, filtered from a small amount of insoluble material and allowed to cool. The benzalphthalide is filtered and washed with cold alcohol. It is sufficiently pure for use in the next step.

(b) *Preparation of dibenzyl-o-carbonic acid.*—A mixture of 289 g. of benzalphthalide, 113.3 g. of hydrogen iodide (sp. gravity 1.7) and 113.3 g. of red phosphorus is refluxed with stirring for ten hours and the resulting mixture poured into ice water. A red crystalline mass is present which is filtered off and dried. The dried solid is extracted with one liter of boiling acetone and filtered while hot. The acetone filtrate is concentrated to about 300 ml. and cooled. One liter of water is added and the mixture is again cooled. The solid which crystallizes is filtered to yield about 243 g. of product, melting at about 115–118°. Recrystallization from aqueous acetone gives the pure product constant melting at about 121–122°.

(c) *Preparation of 10,11-dihydro-5H-dibenzo[a,d]cyclohepten-5-one.*—To 260 ml. of 85% phosphoric acid at 80° is added 377 grams of phosphorus pentoxide. The temperature is kept at 80–90° by slowly adding the phosphorus pentoxide. At the end of the addition, the reaction mixture is kept at 100° for one hour, then heated to 170° and 118 grams of dibenzyl-o-carbonic acid is added portionwise. The mixture is heated at 170° for 2½ hours and then poured with stirring into four liters of ice water and allowed to stand overnight. The dark oil is extracted with 3×700 ml. of ether. The ether is washed with sodium carbonate and dried over magnesium sulfate. After removal of the ether, the residue is distilled to yield about 81 grams of product, boiling at about 175–180°/3.5 mm., $n_D^{28}=1.6315$.

(d) *Preparation of 10,11-dihydro-5H-dibenzo[a,d]cyclohepten-5-ol.*—To a solution of 50 grams of 10,11-dihydro-5H-dibenzo[a,d]cyclohepten-5-one in 500 ml. of methanol is added a solution of 9.1 grams of sodium borohydride in 100 ml. of water at room temperature. The temperature is not controlled and rises to 46°. The resulting solution is refluxed for one hour; the pH adjusted to 4.0 with acetic acid and then the methanol is distilled off. A light yellow oil precipitates which is extracted with ether; the ether dried over magnesium sulfate, filtered and allowed to evaporate at room temperature. The residue is triturated with a small amount of hexane to yield about 43 grams of product melting at about 80–85°. Recrystallization from hexane yields a pure compound, constant melting at about 89–90°.

EXAMPLE 2

*1- and 4-chloro-10,11-dihydro-5H-dibenzo[a,d]cyclohepten-5-ol*

Following the procedure of Example 1, but substituting an equivalent amount of 3-chlorophthalic anhydride for the phthalic anhydride in step *a*, there is obtained a mixture of 4-chloro-3-benzalphthalide, which yields 1-chloro-10,11-dihydro-5H-dibenzo[a,d]cyclohepten-5-ol, and 7-chloro-3-benzalphthalide, which yields 4-chloro-10,11-dihydro-5H-dibenzo[a,d]cyclohepten-5-ol.

EXAMPLE 3

*3-chloro-10,11-dihydro-5H-dibenzo[a,d]cyclohepten-5-ol*

Following the procedure of Example 1, but substituting an equiavlent amount of p-chlorophenyl acetic acid for the phenylacetic acid in step *a*, 3-chloro-10,11,dihydro-5H-dibenzo[a,d]cyclohepten-5-ol is obtained.

Similarly, by substituting an equivalent amount of one of the following phenylacetic acids for the phenylacetic acid in the procedure of step *a* of Example 1 and carrying out steps *a* and *b* in the example the indicated 1-(substituted phenyl)-2-(2-carboxyphenyl) ethanes are obtained which are used as initial products in the following examples:

| Substituted phenylacetic acid: | Product |
| --- | --- |
| 4-methyl | 4-methyl. |
| 4-chloro | p-chloro. |
| 3-methyl | 3-methyl. |
| 2,4-dimethyl | 2,4-dimethyl. |
| 3-tert. butyl | 3-tert. butyl. |

EXAMPLE 4

*3-methyl-10,11-dihydro-5H-dibenzo[a,d]cyclohepten-5-ol*

In a 500 ml. flask 160 grams of phosphorus pentoxide is added to 110 ml. of an 85% phosphoric acid syrup at 80° with stirring. The temperature to the mixture is kept at 100° for one hour, whereupon heating is continued to a temperature of 170°. At this temperature 50 grams of 1-(p-tolyl)-2-(o-carboxyphenyl)ethane is added in small batches with vigorous stirring and stirring is continued for four hours at the same temperature. After cooling the contents of the flask are poured into ice water. After another half an hour of stirring an extraction with ether is carried out. The ethereal solution is washed with a 2 N soda solution and with water. After drying and evaporating the ether the residue is subjected to fractional distillation under reduced pressure. The compound 3-methyl-10,11-dihydro-5H-dibenzo[a,d]cyclohepten-5-one having a boiling point of 165–167°/2 mm. is obtained. Yield 81%.

10 grams of the ketone thus obtained is dissolved in 150 ml. of 96% ethanol and heated for 20 hours under reflux cooling with 2000 grams of 0.5% sodium amalgamate. The alcoholic solution is poured into ice water which has been acidified with 3 N acetic acid. The precipitate is removed by filtration, dried and crystallized from petroleum ether or gasoline. Yield: 87%; melting point 124–125.5%.

EXAMPLE 5

*3-chloro-10,11-dihydro-5H-dibenzo[a,d]cyclohepten-5-ol*

7.8 grams of 1-(p-chlorophenyl)-2-(o-carboxyphenyl)-ethane is dissolved in 10.7 grams of thionylchloride and the resulting solution is boiled for 3 hours under reflux cooling. The excess of thionylchloride is removed by distillation, whereupon the acid chloride is dissolved in 80 ml. of carbon disulphide.

Subsequently 4.6 grams of aluminum chloride is added. When the reaction (which only sets in after a few hours) is terminated, as will appear from the stopping of the generation of hydrochloric acid, boiling is continued under reflux cooling for six hours. After cooling the reaction mixture is poured on ice. The carbon disulphide layer is separated off and the water layer is washed with ether. The combined organic layers are dried with sodium sulfate and filtered, whereupon the solvents are removed by distillation. The residue is subjected to fractionated distillation under reduced pressure. The fraction boiling at 160–164°/0.01 mm. is crystallized from petroleum ether. Yield 4 grams of 3-chloro-10,11-dihydro-5H-dibenzo[a,d]-cyclohepten-5-one, melting at 55–57°. The melting point is raised to 62.5–63.5° by further crystallization.

12.1 grams of the compound so prepared is dissolved in 190 ml. of ethanol 96%. The solution is boiled under reflux for 20 hours with 2.2 kilograms of 0.5% sodium amalgamate. The alcoholic solution is poured on ice water, acidified with 3 N acetic acid. The precipitate formed is filtered, dried and crystallized from gasoline. Yield 9.1 grams (75%) of the desired compound melting at 117–118°.

EXAMPLE 6

*2-methyl-10,11-dihydro-5H-dibenzo[a,d]cyclohepten-5-ol*

24 grams of 1-(2-methylphenyl)-2-(o-carboxyphenyl)-ethane is dissolved in 35.7 grams of thionyl chloride and the resulting solution is boiled for 3 hours under reflux cooling. After completion of the reaction the excess of thionyl chloride is distilled off. The crystalline residue is dissolved in 150 ml. of carbon disulphide and the solution is added dropwise to 20 grams of aluminum chloride. Evolution of hydrogen chloride starts immediately. After the reaction mixture has refluxed for six hours it is poured out on ice. The carbon disulphide layer is separated and the aqueous solution extracted with ether. The combined organic layers are dried and concentrated and the residue is crystallized from ligroin (boiling range 80–100°). Yield 18.5 grams (83%) of 2-methyl-10,11-dihydro-5H-dibenzo[a,d]cyclohepten-5-one; melting point 67.5–68.5°.

An ethereal solution of 18.5 grams of the ketone is added to a solution of 1.5 grams of lithium aluminum hydride in 250 ml. of ether. The mixture is then refluxed for 4 hours, after which it is decomposed by addition of moist ether and aqueous acetic acid. The ethereal layer is washed with water, with a dilute sodium hydroxide solution and again with water and is subsequently dried on sodium sulfate. Evaporation of the solvent yields 16.65 grams (90%) of crystalline 2-methyl-10,11-dihydro-5H-dibenzo[a,d]cyclohepten-5-ol; melting at 97–100° after crystallization from ligroin (boiling range 60–80°).

EXAMPLE 7

*2,4-dimethyl-10,11-dihydro-5H-dibenzo[a,d]cyclohepten-5-ol*

25.8 grams of 1-(3.5-dimethylphenyl)-2-(2-carboxyphenyl)ethane is dissolved in 40 grams of thionyl chloride and the resulting solution is boiled for 3 hours under reflux cooling. The excess of thionyl chloride is removed by distillation, whereupon the acid chloride is dissolved in 150 ml. of carbon disulphide. The solution is added dropwise to 20 grams of aluminum chloride. The reaction mixture is boiled under reflux as long as hydrogen chloride is evolved and then poured out on ice.

The carbon disulphide layer is separated off and the water layer is washed with ether. The combined organic layers are dried with anhydrous sodium sulfate and filtered whereupon the solvents are removed by distillation. The residue can be purified by subjecting it to fractional distillation under reduced pressure. Further purification can be reached by crystallization from petroleum ether. Yield 12 grams of 2,4-dimethyl-10,11-dihydro-5H-dibenzo-[a,d]cyclohepten-5-one, melting point 110–112°. These 12 grams of ketone are dissolved in ether. The ethereal solution is added to a solution of 1.0 gram of lithium aluminum hydride in 200 ml. of ether. The mixture is refluxed for 4 hours, whereafter it is decomposed by addition of moist ether and aqueous acetic acid. The ethereal layer is washed with water, with a dilute sodium hydroxide solution and again with water and is subsequently dried on anhydrous sodium sulfate. Evaporation of the solvent yields 9.6 grams (80%) of crystalline, 2,4-dimethyl-10,11-dihydro-5H-dibenzo[a,d]cyclohepten-5-ol, melting at 102–104°.

EXAMPLE 8

*3-tert.butyl-10,11-dihydro-5H-dibenzo[a,d]cyclohepten-5-ol*

38.3 grams of 1-(3-tert.butylphenyl)-2-(2-carboxyphenyl)-ethane is mixed with 35.7 grams of thionyl chloride and refluxed for a period of 3 hours. The excess of thionyl chloride is distilled off. The crystalline residue is dissolved in 180 ml. of carbon disulphide and the solution is added dropwise to 20 grams of aluminium chloride. A stream of hydrogen chloride is evolved. The reaction mixture is heated under reflux for a period of 8 hours. The mixture is cooled thereafter and poured on ice and hydrochloric acid. After addition of benzene, the mixture is filtered. The organic layer is separated and washed thoroughly with 2 N sodium hydroxide and thereafter with water. The solution is dried on sodium sulfate. After removal of the solvents by distillation an oil remains which can be used directly for the reduction to the corresponding carbinol. The yield of impure 3-tert.butyl-10,11-dihydro-5H-dibenzo[a,d]cyclohepten-5-one amounts to 83%. 30.3 grams of the ketone is dissolved in ether. The ethereal solution is gradually added to a solution of 1.6 grams of lithium aluminium hydride in 280 ml. of ether. The mixture is thereupon refluxed for 4 hours, after which it is decomposed by addition of moist ether and aqueous acetic acid. The ethereal layer is washed with water, with a dilute sodium hydroxide solution and again with water and is subsequently dried on sodium sulfate. Evaporation of the solvent yields 18.2 grams of 3-tert.butyl - 10,11 - dihydro-5H-dibenzo[a,d]cyclohepten-5-ol.

EXAMPLE 9

*5-chloro-10,11-dihydro-5H-dibenzo[a,d]cycloheptene*

210 grams of 10,11-dihydro-5H-dibenzo[a,d]cyclohepten-5-ol is dissolved in 1000 ml. of anhydrous benzene. 50 ml. of freshly distilled thionyl chloride is added dropwise in a period of about 30 minutes under stirring and cooling. The temperature is maintained between 10 and 15°. After the addition of the thionyl chloride stirring is continued for another 2 hours at the same temperature range. 125 grams of anhydrous sodium sulfate is then added and the mixture is stirred for another 2 hours. The solution is filtered, the sodium sulfate washed with portions of 50 ml. of benzene. The combined organic layers are concentrated by distillation under reduced pressure until a solid starts separating. 1000 ml. of petroleum ether, boiling range 80–100°, is then added whereupon residual benzene is distilled off under atmospheric pressure. The distillation is discontinued when the temperature reaches about 84°. The residue is cooled and 3 g. of charcoal powder is added. The mixture is boiled under reflux for about 10 minutes and filtered; the filtrate is cooled. The crystalline material is separated by filtration and washed with small portions of petroleum ether (boiling range 80–100°). 181.5 grams (79.4%) of a white, pure crystalline is obtained melting at 105–107°.

A second portion of the desired substance can be obtained upon concentration of the mother liquor and subjecting the concentrate to the above treatment. Total yield increases to 195.5 grams (85.6%).

*Analysis.*—Calculated for $C_{15}H_{13}Cl$: C, 78.77%; H, 5.73%; Cl, 15.50%. Found: C, 78.5%; H, 5.6%; Cl, 15.2%.

EXAMPLE 10

*N-(10,11-dihydro-5H-dibenzo[a,d]cyclohepten-5-yl)-N'-methylpiperazine, salt with maleic acid*

To a solution of 5 grams of N-methylpiperazine in 100 ml. of xylene containing 13 grams of potassium carbonate is added 11.4 grams of 5-chloro-10,11-dihydro-5H-dibenzo[a,d]cycloheptene in 100 ml. of xylene under vigorous stirring and gentle heating.

The reaction mixture is boiled under reflux for 2½ hours and then cooled to room temperature. The mixture is then washed with water and dried over sodium sulfate. The solid is filtered off. The xylene is then removed under reduced pressure leaving a residue of 6.5 (44.5%) grams of N-(10,11-dihydro-5H-dibenzo[a,d]cyclohepten-5-yl)-N'-methylpiperazine. Melting point, after crystallization from petroleum ether, 107–109°.

*Analysis.*—Calculated for $C_{20}H_{24}N_2$: C, 82.13%; H, 8.27%; N, 9.58%. Found: C, 81.88%; H, 7.86%; N, 9.85%.

The free base is converted into the mono maleic acid salt, which after crystallization from a mixture of acetone and ether melts at 145–147°.

EXAMPLE 11

*N-(10,11-dihydro-5H-dibenzo[a,d]cyclohepten-5-yl)-N'-benzylpiperazine*

7 grams of N-benzylpiperazine is heated to 100°. 21.6 grams of 5-chloro-10,11-dihydro-5H-dibenzo[a,d]-cycloheptene is added. The temperature quickly rises to 140° and is kept at that value for a short while. The mixture is cooled and then water is added. The reaction mixture is made alkaline with sodium hydroxide and is then taken up with ether. The ethereal solution is dried. The ether is then removed leaving a residue of N-(10,11-dihydro - 5H - dibenzo[a,d]cyclohepten-5-yl)-N'-benzyl-piperazine. After crystallization from methanol 4 grams (54%) of the pure compound constantly melting at 120–121° is obtained.

*Analysis.*—Calculated for $C_{26}H_{28}N_2$: C, 84.74%; H, 7.66%; N, 7.60%. Found: C, 84.54%; H, 7.59%; N, 7.59%.

EXAMPLE 12

*N-(10,11-dihydro-5H-dibenzo[a,d]cyclohepten-5-yl)-N'-phenylpiperazine*

10.5 grams of phenylpiperazine and 4.6 grams of 5-chloro-10,11-dihydro - 5H - dibenzo[a,d]cycloheptene are heated together at a temperature of about 140°. After cooling, water is added to the reaction mixture. Thereupon the mixture is made alkaline by addition of sodium hydroxide and then it is extracted with benzene. The benzene solution is dried on sodium sulfate and concentrated by evaporation of the solvent. The solid obtained is recrystallized from a mixture of benzene and methanol; 3.5 grams (49%) of N-(10,11-dihydro-5H-dibenzo[a,d]-cyclohepten - 5 - yl) - N' - phenylpiperazine are obtained. Melting point: 178.5–182°.

*Analysis.*—Calculated for $C_{25}H_{26}N_2$: C, 84.70%; H, 7.39%; N, 7.90%. Found: C, 84.31%; H, 7.33%; N, 8.24%.

EXAMPLE 13

*N-(10,11-dihydro-5H-dibenzo[a,d]cyclohepten-5-yl)-N'-methylhomopiperazine*

Following the procedure of Example 11 but substituting an equivalent amount of N-methyl-homopiperazine for the N - benzylpiperazine, N-(10,11-dihydro-5H-dibenzo-[a,d]cyclohepten-5-yl)-N'-methyl-homopiperazine is obtained.

If 1-chloro-10,11-dihydro-5H-dibenzo[a,d]cyclohepten-5-ol, 4-chloro-10,11-dihydro-5H-dibenzo[a,d]cyclohepten-5-ol, 3-chloro-10,11-dihydro-5H-dibenzo[a,d]cyclohepten-5-ol, 3-methyl - 10,11 - dihydro - 5H - dibenzo[a,d]cyclohepten-5-ol, 2-methyl-10,11-hydro-5H-dibenzo[a,d]cyclohepten-5-ol, 2,4-dimethyl-10,11-dihydro-5H-dibenzo[a,d]cyclohepten-5-ol, and 3-tert.-butyl-10,11-dihydro-5H-dibenzo[a,d]cyclohepten-5-ol are substituted for 10,11-dihydro-5H-dibenzo[a,d]cyclohepten-5-ol in the procedure of Example 9, the corresponding 5-chloro derivatives are obtained. These 5-chloro derivatives may then be converted to their respective 5-(N-methylpiperazino), 5-(N-benzylpiperazino), 5-(N-phenylpiperazino), and 5-(N-methyl-homopiperazino) derivatives by the procedures of Examples 10 through 13, respectively.

The invention includes within its scope pharamceutical preparations containing one or more of the therapeutically active compounds of the invention in association with a pharmacologically acceptable carrier.

What is claimed is:

1. A compound selected from the group consisting of bases of the formula

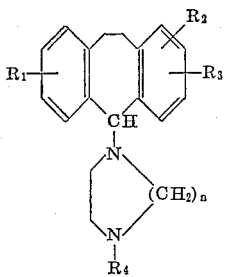

wherein $R_1$, $R_2$ and $R_3$ are each selected from the group consisting of hydrogen, halogen and lower alkyl, $n$ is a positive integer less than 4, and $R_4$ is selected from the group consisting of lower alkyl, monocyclic hydrocarbon aryl, monocyclic hydrocarbon aryl lower alkyl, monohydroxy-lower alkyl, and di-hydroxy-lower alkyl, and non-toxic acid addition salts thereof.

2. N-(10,11 - dihydro - 5H - dibenzo[a,d]cyclohepten-5-yl)-N'-methyl piperazine.

3. A non-toxic acid-addition salt of the compound of claim 2.

4. N-(10,11 - dihydro - 5H - dibenzo[a,d]cyclohepten-5-yl)-N'-phenyl piperazine.

5. N-(10,11-dihydro - 5H - dibenzo-[a.d]cyclohepten-5-yl)-N'-benzyl piperazine.

6. N-(10,11-dihydro - 5H - dibenzo[a,d]cyclohepten-5-yl)-N'-methyl homopiperazine.

References Cited by the Examiner

UNITED STATES PATENTS

| | | | |
|---|---|---|---|
| 2,658,926 | 11/53 | Hyman et al. | 260—649 |
| 2,921,069 | 1/60 | Ullyot | 260—268 |
| 2,928,767 | 3/60 | Gulesich et al. | 260—268 |
| 2,931,810 | 4/60 | Yale et al. | 260—268 |
| 2,940,969 | 6/60 | Bonvicino et al. | 260—268 |
| 2,985,660 | 5/61 | Judd et al. | 260—328 |
| 3,041,341 | 6/62 | Barrett et al. | 260—268 |
| 3,043,842 | 7/62 | Craig | 260—268 |
| 3,043,886 | 7/62 | Serres et al. | 260—249 |
| 3,073,847 | 1/63 | Daebel et al. | 260—328 |

FOREIGN PATENTS

| | | |
|---|---|---|
| 858,186 | 1/61 | Great Britain. |
| 1,172,514 | 2/59 | France. |

OTHER REFERENCES

Winthrop et al.: Journal Organic Chemistry, vol. 27, pp. 230–234 (January-April 1962).

Villani et al.: Journ. of Med. and Pharm. Chem., volume 5, No. 2 (1962), pages 373–83.

IRVING MARCUS, *Primary Examiner.*

D. T. McCUTCHEN, NICHOLAS S. RIZZO, *Examiners.*